No. 607,760. Patented July 19, 1898.
J. MIESLER.
CIRCUIT ARRANGEMENT FOR ELECTRICAL APPARATUS.
(Application filed Dec. 13, 1897.)
(No Model.)
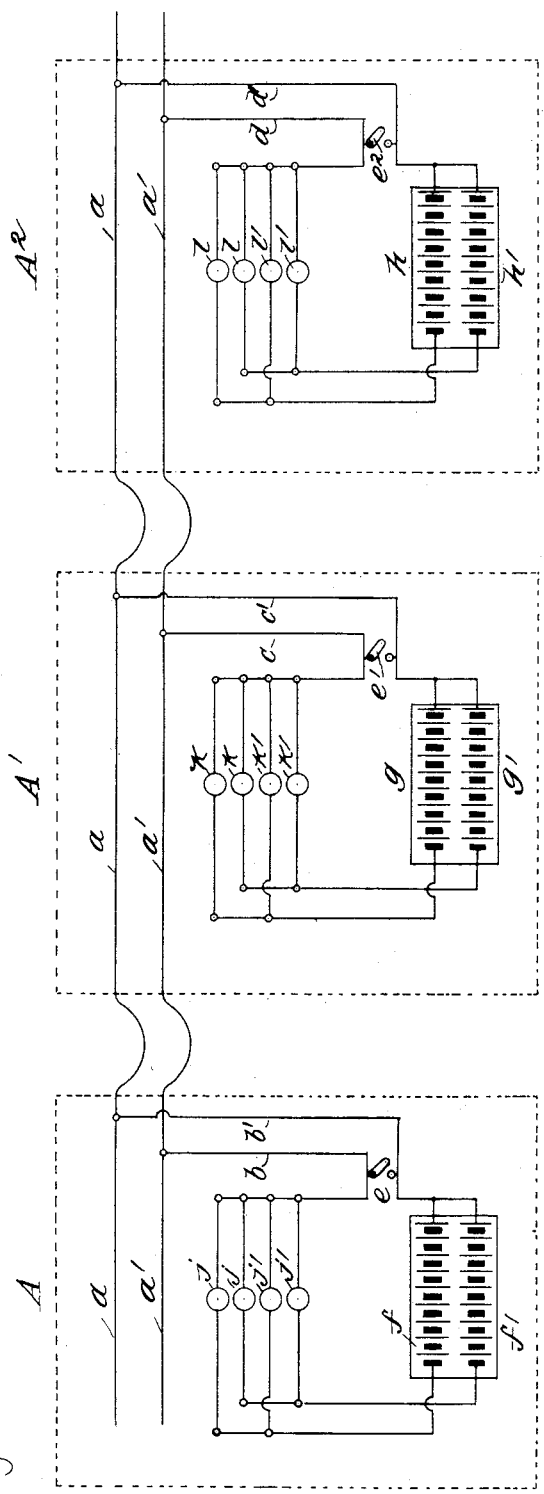

UNITED STATES PATENT OFFICE.

JULIUS MIESLER, OF VIENNA, AUSTRIA-HUNGARY, ASSIGNOR TO THE SIEMENS & HALSKE ELECTRIC COMPANY OF AMERICA, OF CHICAGO, ILLINOIS.

CIRCUIT ARRANGEMENT FOR ELECTRICAL APPARATUS.

SPECIFICATION forming part of Letters Patent No. 607,760, dated July 19, 1898.

Application filed December 13, 1897. Serial No. 661,614. (No model.) Patented in Germany March 21, 1896, No. 89,555; in Switzerland March 30, 1896, No. 11,981; in Italy May 22, 1896, No. 41,260, and in Austria September 18, 1896, No. 46/3,618.

*To all whom it may concern:*

Be it known that I, JULIUS MIESLER, a subject of the Emperor of Austria-Hungary, residing at III/I Apostelgosse 12, Vienna, Austria-Hungary, have invented new and useful Improvements in Circuit Arrangements for Electrical Apparatus, (Case No. 91,) of which the following is a specification, and for which Letters Patent have been granted in Germany, No. 89,555, dated March 21, 1896; in Italy, No. 41,260, dated May 22, 1896; in Switzerland, No. 11,981, dated March 30, 1896, and in Austria, No. 46/3,618, dated September 18, 1896, My invention relates to an improved circuit arrangement for electrical apparatus, and has for its object the provision of means for securing the simultaneous control of a plurality of separate or individual circuits.

In electrical practice the requirement is frequently met with that a number of electrical circuits or separate pieces of apparatus be simultaneously controlled from different positions through the medium of any one of a number of circuit-controlling devices, and my invention is designed to provide means whereby such control may be readily effected.

The precise application in connection with which I will describe my invention is that of controlling the incandescent lamps provided upon the several cars of a train by means of any one of a number of switches located within said cars. The same will be more readily comprehended by reference to the accompanying drawing, wherein are diagrammatically indicated the apparatus and several circuits for thus operating the lamps provided upon said cars.

The representation of the apparatus and individual circuits of each of the three cars A A' A² is respectively inclosed within dotted lines. Connecting-mains $a\,a'$ extend between the cars and are electrically united to complete the system by any suitable connection or coupling. Between the said mains are connected in parallel the individual circuits of the cars, which are indicated as connected, respectively, with the conductors $b\,b'$, $c\,c'$, $d\,d'$.

Switches $e\,e'\,e^2$ are provided, which when closed are adapted to short-circuit the respective loops or branches which they control and also the electrical apparatus provided upon the corresponding car.

Storage batteries $f\,f'$, $g\,g'$, $h\,h'$ are respectively connected in series with a corresponding group of lamps $j\,j'$, $k\,k'$, $l\,l'$, which the said batteries are adapted to supply with current and furnish illumination for the cars when connected in circuit therewith. The batteries are so connected that their positive poles are electrically united with the main $a$, while the negative poles thereof are connected with the other main $a'$.

Each of the several switches is normally maintained open; but when it is desired to illuminate the cars any one of the switches may be closed, which will result in immediately securing the simultaneous illumination of all the cars of the train. Thus, for instance, if the switch $e'$ be closed upon car A' the battery and lamps of the said car will be short-circuited within the car, and the car will at once be illuminated. The closure of the switch serves simultaneously to close the respective circuits of cars A and A², the current flowing from the batteries $f\,f'$ of car A through conductor $b'$ to main $a$, thence through conductor $c'$, switch $e'$, conductor $c$, main $a'$, conductor $b$, through the lamps $j\,j'$, and to the negative poles of the batteries. Similarly the lamps of car A² will be illuminated, the current from the batteries $h\,h'$ likewise being electrically connected with the lamps $l\,l'$ through the medium of mains $a\,a'$ and switch $e'$.

It will be seen with this arrangement of apparatus that the closure of any switch upon the train will simultaneously effect the illumination of all the lamps provided in the several cars thereof, and thus the trainman or attendant is enabled to control the lighting of an entire train from any one of the several switches provided upon the cars. While any one of said switches is thus closed, it is also apparent that the lights throughout the entire train will burn, making their extinguishment dependent upon the opening of all the switches connected with the circuit. Furthermore, the circuit connections of the system are of the simplest character, since two mains $a\, a'$ common to all the cars are alone employed for securing this simultaneous actuation, thus making the connection and disconnection of the cars an easy matter, involving no further preparations than the coupling of the mains connected with the positive and negative poles of the battery to the corresponding portions of the mains upon the other cars.

The utility of the above-described arrangement of circuits and apparatus will be appreciated when it is considered that demands are often made—as, for instance, when numerous tunnels are encountered—for the frequent illumination and extinguishing of the lamps of a train. Such conditions are also met with in controlling various other classes of electrical apparatus connected in individual circuits.

This arrangement or association of electrical apparatus of my invention is capable of numerous variations without departing from the spirit thereof, and I do not desire to be understood as limiting its application to the precise apparatus or adaptation herein set forth; but, Having described one application of my said invention, what I claim as new, and desire to secure by these Letters Patent, is—

1. The herein-described circuit arrangement, consisting of the association with common mains or conductors $a\, a'$, of a plurality of individual or separate circuits in parallel relation therewith, each of said circuits being provided with a source or supply of electrical energy, a translating device, and a switch device disposed in said circuit and adapted to short-circuit the electrical apparatus connected between said mains when said device is closed.

2. The circuit arrangement of electrical apparatus herein described, consisting of the connection with common mains or conductors, of a plurality of separate or individual circuits in multiple relation, each of said circuits having connected therein a source or supply of electrical energy, and a translating device or devices, and a plurality of circuit-controlling devices connected in multiple relation between the said mains adapted when closed individually to afford a path of low resistance for the several circuits connected with said mains.

3. The combination with mains $a\, a'$, of a plurality of separate circuits as $A\, A'\, A^2$ connected in parallel therewith, each of said circuits consisting of a translating device or devices, a source of electrical energy, and a circuit-controlling device associated with said circuit and with the mains and adapted when closed, to effect the closure of the corresponding circuit and afford a low-resistance path for the flow of current between the mains, substantially as described.

4. In a system of electric lighting, the combination with common mains or conductors, of a plurality of individual lighting-circuits connected in multiple therewith, each of said circuits being provided with a group of lamps, and a battery or source of electrical energy connected in series therewith, like poles of said batteries being connected with a common main, and a plurality of switching devices connected in said system and adapted individually to effect the short-circuit of the apparatus connected between the mains, substantially as described.

5. The herein-described system of electric-light control for trains comprising common mains $a\, a'$ between which the individual circuits $A\, A'\, A^2$ are connected in multiple, each of said circuits having connected therein a battery or accumulator, and electric lamps connected in series, and a switch associated with said circuit adapted to short-circuit said battery through the lamps and afford a low-resistance path for the current from the other batteries through their respective lamps.

In testimony whereof I affix my signature in the presence of two witnesses.

JULIUS MIESLER.

Witnesses:
 HENRY C. CARPENTER,
 CHAS. E. CARPENTER.